(12) United States Patent
Wong et al.

(10) Patent No.: US 8,852,333 B2
(45) Date of Patent: Oct. 7, 2014

(54) MULTI-FUNCTIONAL ENVIRONMENTAL COATING COMPOSITION WITH MESOPOROUS SILICA NANOMATERIALS

(71) Applicant: Nano and Advanced Materials Institute Limited, Hong Kong (HK)

(72) Inventors: Ka Wai Wong, Hong Kong (HK); Xinghua Li, Hong Kong (HK); Yee Man Ho, Hong Kong (HK); Wing Yee Cheng, Hong Kong (HK); Ka Cheong Luk, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 0 days.

(21) Appl. No.: 13/717,734

(22) Filed: Dec. 18, 2012

(65) Prior Publication Data

US 2013/0203933 A1  Aug. 8, 2013

Related U.S. Application Data

(60) Provisional application No. 61/633,140, filed on Feb. 6, 2012.

(51) Int. Cl.
*C09D 183/00* (2006.01)
*C08K 3/34* (2006.01)

(52) U.S. Cl.
CPC ......................................... *C08K 3/34* (2013.01)
USPC ............ 106/287.12; 106/287.13; 106/287.14; 106/287.16; 106/287.19; 427/427; 427/430.1; 427/458

(58) Field of Classification Search
None
See application file for complete search history.

(56) References Cited

U.S. PATENT DOCUMENTS

| | | | |
|---|---|---|---|
| 5,322,865 A | 6/1994 | Inoue et al. | |
| 5,747,558 A | 5/1998 | Nishi et al. | |
| 5,972,425 A | 10/1999 | Nishi et al. | |
| 6,787,190 B2 | 9/2004 | Iizuka | |
| 8,043,701 B2 | 10/2011 | Edelmann et al. | |
| 8,105,681 B2 | 1/2012 | Tanimoto et al. | |
| 2009/0099298 A1 | 4/2009 | Yukawa | |
| 2009/0414256 | 6/2009 | Takahashi et al. | |
| 2009/0269016 A1 | 10/2009 | Korampally et al. | |
| 2013/0196140 A1* | 8/2013 | Lewis et al. | 428/312.6 |

FOREIGN PATENT DOCUMENTS

EP         1447433 A1    8/2004
WO    WO 2012/022983     *  2/2012

OTHER PUBLICATIONS

Abstract for CN 102153291 (Aug. 2011).*
Boris Mahltig et al., "Functionalising wood by nanosol application", Journal of Materials Chemistry, 2008, 18(27), p. 3180-3192.
Daoxing Sun et al. "Preparation of fast-drying waterborne nano-complex traffic-marking paint" Journal of Coatings Technology and Research, 2012, 9(2), p. 151-156.
Robert I. Nooney et al., "Synthesis of Nanoscale Mesoporous Silica Spheres with Controlled Particle Size", Chemistry of Materials, 2002, 14, p. 4721-4728.
J. I. Iribarren et al., "On the use of conducting polymers to improve the resistance against corrosion of paints based on polyurethane resins", Materials and Corrosion, 2006, 57(9), p. 683-688.
Jessica M. Rosenholm et al., "Towards multifunctional, targeted drug delivery systems using mesoporous silica nanoparticles—opportunities & challenges", Nanoscale, 2010, 2(10), p. 1870-1883.

* cited by examiner

*Primary Examiner* — Marc Zimmer
(74) *Attorney, Agent, or Firm* — Ella Chong Hong Kong; Sam T. Yip

(57) ABSTRACT

A new generation environmental friendly water-based coating composition which exhibits excellent coating film properties is disclosed. Said water-based coating composition comprises mesoporous silica nanoparticles in organosilica, water, and a film-forming catalyst, and optionally with a small amount of ethanol. Method for manufacturing said water-based coating composition and the use thereof are also disclosed.

17 Claims, 2 Drawing Sheets

| | Present Composition | Commercial Environmental Coating composition | | |
|---|---|---|---|---|
| | | Commercial Coating composition A | Commercial Coating composition B | Commercial Coating composition C |
| Key ingredients | MSN & organosilica | Modified polyurethane | Acrylic copolymer | Modified nitrocellulose |
| RoHS | ✓ | No info. | No info. | No info. |
| VOC | ✓ | No info. | No info. | No info. |
| Water Resistance (by contact angles) | >90° | 71° | 74° | 66° |
| Anti-scratch (ASTM D 3363-05) | 2H | 2H | 2H | 2H |
|     200gram load | ✓ | ✓ | ✓ | ✓ |
|     500gram load | ✓ | ✗ | ✓ | ✓ |
| Matt to Gloss | up to 45 | up to 25 | up to 20 | up to 15 |
| Flame Retardant (ISO 11925-2) | ✓ | ✓ | ✓ | ✓ |
| Anti-bacterial (BS EN 113/ASTM E2149-10) | ✓ | ✓ | ✓ | ✓ |
| Resistant to household chemicals (ASTM D1308) | | | | |
|     Ethyl alcohol (30% volume) | ✓ | ✓ | ✓ | ✓ |
|     Vinegar (1% acetic acid) | ✓ | ✓ | ✓ | ✓ |
|     Lemon Tea | ✓ | ✓ | ✓ | ✓ |
|     Coffee | ✓ | ✗ | ✓ | ✓ |
|     Lubricating Oils and Greases | ✓ | ✓ | ✗ | ✗ |
| UV protection (% UVA blocked) | 23% | 6% | 2% | 4% |
| Good weathering behaviour (EN 927-6) | ✓ | ✓ | ✓ | ✓ |

✓=passed, complied; ✗=failed, not complied.

MULTI-FUNCTIONAL ENVIRONMENTAL COATING COMPOSITION WITH MESOPOROUS SILICA NANOMATERIALS

CROSS-REFERENCE TO RELATED APPLICATIONS

The present application claims priority of U.S. provisional application No. 61/633,140 filed Feb. 6, 2012, the disclosure of which is hereby incorporated by reference.

FIELD OF THE INVENTION

The present invention relates to a new generation environmental water-based coating composition with attractive characteristics, such as high chemical tunability for functional modification, shortened drying time, high adhesive strength and anti-scratch property. The present invention also relates to methods of preparing the environmental water-based coating composition and articles coated by the coating composition.

TECHNICAL BACKGROUND

Various goods and products, such as furniture, vehicles, construction materials are susceptible to damage by oxygen, light, water or the like. These various goods and products are often coated with coating composition for protection and functionalization. Solvent-based coating compositions have long been used in surface finishing due to their favorable coating characteristics. However, these solvent-based coating compositions are associated with hazardous volatile organic chemicals, heavy metals and other environmental-unfriendly materials that pose serious health and environmental concerns. As a result, the coating composition industry has now turned its focus towards developing a water-based coating composition coat.

Current aqueous-based environmental coating compositions are generally based on high molecular weight resin, modified polyurethane and acrylic materials in order to reduce the content of organic solvent. Kansai Paint Co. Ltd. developed a product based on water dispersible acrylic polymer particles (U.S. Pat. No. 5,322,865 and U.S. Patent Application Publication 2009/0099298) and polyurethane (U.S. Pat. No. 6,787,190). In U.S. Pat. Nos. 5,747,558 and 5,972,425, water-dispersible resins for coating are disclosed. Nevertheless, conventional water-based coating compositions suffer from weak film-coating performance, long-drying time, and limited functional and chemical tunability. Studies have been carried out to investigate water-based composition with better coating film performances, such as mechanical properties and water resistance. Iribarren et al. (Materials and Corrosion, Volume 57, Issue 9, Pages 683-688, 2006) teaches that polyurethane resin-based coating composition modified by a conducting polymer improves resistance to corrosion. Sun et al. (Journal of Coatings Technology and Research 2012) teaches an acrylic-based fast drying water-resistant coating composition made up of crosslinkable monomers polymerized with acrylate, nano-silica blended latex, polyfunctional amine, pigments and filler. Recently, the application of silica and other inorganic nanosols has been found to be valuable in functionalization of wood surfaces (Mahltig et al., Fuctionalising wood by nanosol application, Journal of Material Chemistry, 2008, volume 18, pages 3180-3192). Nonetheless, the existing water-based coating compositions only possess satisfactory coating performance as compared to solvent-based coating compositions. Therefore, there is a need for a new water-based coating composition with improved film coating performances.

The present invention describes a new generation of environmental water-based coating composition based on organosilica with enhanced properties over the existing water-based compositions. The present coating composition demonstrates improves mechanical strength, high chemical tunability for functional modification, high surface hydrophobicity and shortened drying time. The high chemical tunability of the present invention means that attractive properties can be easily added to the coating composition by incorporating desired functional additives.

SUMMARY OF THE INVENTION

The objective of the present invention is to provide a new generation environmental friendly water-based coating composition which exhibits excellent coating film properties, including but are not limited to strong mechanical strength, strong hydrophobicity, strong adhesive strength, water resistance, anti-scratch property and high chemical tunability where extra functions can be incorporated into the coating composition easily through appropriate addition of additives.

A first aspect of the present invention is an environmental water-based coating composition comprises mesoporous silica nanoparticles (MSNs) in organosilica and water. To add extra functionality to the composition, the water-based coating composition includes one or more appropriate functional additives. When necessary, small amount of organic solvent may be added to the composition. The present composition can also be used in combination with one or more other commercial coating composition in the art. The present composition can be clear and non-colored, clear and colored or opaque and colored. Where the present composition is clear and non-colored, it is meant that rays of light can be transmitted through a surface being effected with the present composition and the original color of the surface is unchanged upon coated with the present composition. Where the present composition is clear and colored, it is meant that rays of light can be transmitted through a surface being effected with the present composition, but the surface is changed or tinted by the color of the present composition being coated.

A second aspect of the present invention is a method of coating a surface for protection and functionalization by applying the present environmental water-based coating composition. Said applying step may be conventional spray coating, brushing, dipping, roller coating, flow coating or the like. Said method may also be the conventional two-coat one-bake or two-coat two-bake readily known to those skilled in the art. In one embodiment, the surface having effected with the subject coating composition may or may not be heat-cured. One or multiple layers of the subject coating composition may be applied onto the surface of interest as desired. In one embodiment, the method further comprises applying one or more other coating composition that are free from MSNs to said surface before and/or after the application of the subject water-based coating composition. Said one or more other coating composition may be the same or different.

A third aspect of the present invention is an article coated by the subject water-based coating composition. Any articles or surfaces which require coating for protection may be coated with the coating composition of the subject application. The articles or surfaces may be coated by methods as described in the present application.

BRIEF DESCRIPTION OF THE DRAWINGS

FIG. 1 are scanned electron microscope images of MSNs applicable for the present invention.

FIG. 2 shows general properties of the present invention and three commercially available environmental coating compositions.

DETAILED DESCRIPTION OF THE INVENTION

Figure 1A:
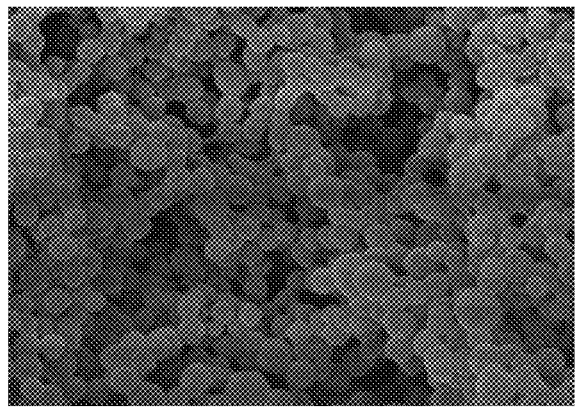
FIGS. 1a, 1b and 1c are ×50,000, ×25,000 and ×40,000 magnifications, respectively.

Reference will now be made in detail to the presently preferred embodiments of the invention, which together with the following examples, serve to explain the principles of the invention. These embodiments are described in sufficient detail to enable those skilled in the art to practice the invention, and it is to be understood that other embodiments may be utilized, and that structural and chemical changes may be made without departing from the spirit and scope of the present invention.

It is discovered by the Applicants of the subject invention that mesoporous silica nanoparticles (MSNs)-containing organosilica, water-based coating composition exhibits superior coat film characteristics, such as significant surface hydrophobicity, anti-scratch property with short drying time as compared to the same coating composition without MSNs.

The present invention provides an environmental water-based coating composition comprises mesoporous silica nanoparticles, organosilica and water.

One or more different types of said mesoporous silica nanoparticles and organosilica may be found in the present composition. The present water-based coating composition further comprises a film forming catalyst known in the art. The film forming catalyst includes acids and bases that are commonly used to catalyze hydrolysis reactions, such as hydrochloric acid, sulphuric acid, sodium hydroxide and potassium hydroxide. The film forming catalyst catalyzes hydrolysis of organosilica, thereby speeding up film formation and shortening drying time of the present invention.

In one embodiment, the film forming catalyst is hydrochloric acid (preferably 0.1M) or a water soluble polyacrylic ester/acid. The coating composition comprises about 55-75% by weight of organosilica, about 5-15% by weight of MSNs, about 10-20% by weight of film forming catalyst and about 10-15% of distilled water as solvent. In another embodiment, the present invention is applied onto surfaces in combination with one or more other coating composition readily available in the art. One or multiple layers of said one or more other coating composition may be applied onto a surface of interest before and/or after coating by the present water-based coating composition. In one embodiment, the present invention is used as a base coat coating composition. The present composition can be clear and non-colored, clear and colored or opaque and colored. Where the present composition is clear and non-colored, it is meant that rays of light can be transmitted through a surface being effected with the present composition and the original color of the surface is unchanged upon coated with the present composition. Where the present composition is clear and colored, it is meant that rays of light can be transmitted through a surface being effected with the present composition, but the surface is tinted by the color of the present composition being coated.

The environmental water-based coating composition having mesoporous silica nanoparticles according to the present invention exhibits technological superiorities over existing water-based coating composition. The water-based coating composition according to the present invention associates with less than 100 g/L volatile organic chemicals (VOC) complying with Restriction of the use of Hazardous Substances (RoHS) and Environmental Regulations on VOC in Europe, China and Hong Kong that have a general requirement of 150-550 g/L.

Unlike many existing polyurethane and polyacrylate coating compositions which impose a yellow color on the coated surfaces, the present invention possesses high transparency and does not have residual coating composition odor upon drying. The high transparency of the present invention also means that desired colors can be easily established by addition of color pigments or color of the surface being coated with the present coating composition is unaffected. The subject coating composition is also highly hydrophobic intrinsically. Commercially environmental coating compositions generally demonstrate contact angles in a range of 60-80°, whereas the subject coating composition has a significant higher contact angle of greater than 90° and up to 120° with the surface coated therewith, leading to excellent water resistance performance (Table 1). The instant coating composition demonstrates anti-scratch property of up to 4B under ASTM D 3363-05 test (Table 3) and adhesive strength of up to 2H with 1000 g vertical load under ASTM D 3359-08 test (Table 2), superior over those conventional solvent-based and commercial water-based coating compositions. The present invention is also showed to be rapid to dry, associated with less than 2 hours for touch dry. Furthermore, the present coating composition demonstrates good weathering behavior under testing method EN 927-6 and qualifies standard testing method ASTM D1308 for resistance to household chemicals.

The highly chemical tunability of the coating composition means extra functional characteristics can be easily added through appropriate chemical engineering and incorporation of functional and nano additives. In another embodiment, the present invention further includes appropriate functional additives corresponding to the supplemental functional characteristic desired to be added to the water-based coating composition. The functional additives may be 0.1-1% by weight. When necessary, the present invention may include a small portion of organic solvent. The organic solvent suitable for the subject invention includes but is not limited to, alcohols such as methanol, ethanol, isopropanol, n-butanol, sec-butanol, t-butanl, etc.; ether alcohols, such as but are not limited to, ethylene glycol monomethyl ether, ethylene glycol monoethyl ether, ethylene glycol monobutyl ether, etc.; esters; ketones and the like.

The present environmental water-based coating composition with outstanding coat film characteristics is manufactured by mixing MSN with organosilica and distilled water thoroughly to form a first mixture, a film forming catalyst is then added dropwise into the first mixture to form a second mixture. The second mixture is mixed continuously for approximately 8 hours until the mixture becomes clear. An effective amount of appropriate functional additives for desired functional properties, such as UV absorbing substance, anti-fungal agents are added into the clear second mixture. The aforementioned steps of mixing and adding are all performed under mild heating condition of approximately 60° C. For mass production of the present coating composition, appropriate industrial equipments are used, such as industrial mixing tank with heating and cooling jacket, centrifuge and filtration system.

Mesoporous Silica Nanoparticles

The water-based environmental coating composition of the present invention comprises up to 15% by weight of mesoporous silica nanoparticles. In an embodiment, the present composition comprises approximately 5-10% by weight of mesoporous silica nanoparticles. In one embodiment, the MSNs are approximately 9% by weight. In another embodiment, the MSNs are approximately 8% by weight.

MSNs of the present invention are generally synthesized from a silica precursor and a structure directing agent.

Examples of silica precursor useful in the production of MSNs of the present invention includes, but is not limited to tetraethyl orthosilicate (TEOS), 3-aminopropyltriethoxysilane (APTS), waterglass, 3-aminopropyl-trimethoxysilane and tetramethoxysilane. Structure directing agents that can be used to synthesize MSNs includes cetyltrimethylammonium bromide (CTAB), fatty acid, Pluronic P123, Pluronic F127 and amphiphilic block copolymer. In one embodiment, MSNs of the present invention are prepared from cationic quaternary ammonium salts, such as CTAB and TEOS being the silica precursor. In some embodiment, functional silanes can also be added together with TEOS as silica precursor for synthesizing MSNs of the present invention.

Figure 1B:
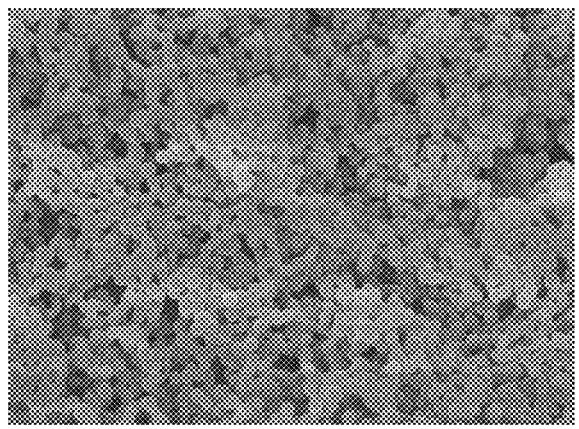
Figure 1C:
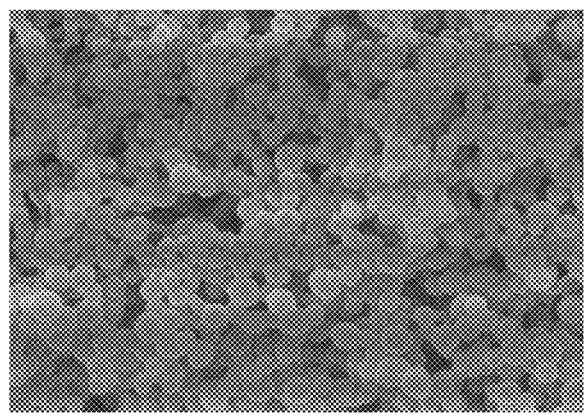

Other silane compounds known to those skilled in the art may be used to prepare MSNs suitable for the subject invention. The present coating composition can comprise one or more types of MSNs. The term "MSNs" as used herein refers to one or more different types of MSNs. US2009/0142565, EP1447433 and Rosenholm et al. (Towards multifunctional, targeted drug delivery systems using mesoporous silica nanoparticles—opportunities & challenges, Nanoscale, 2010, vol. 2, 1870-1883) describe various silane compounds and methods for preparation of MSNs suitable for the present invention. One skilled in the art would readily acknowledge that different combinations of silica precursor and structure directing agent along with different synthesis conditions will results in different particle size of MSNs of distinct pore diameters. MSNs of the present invention are synthesized by methods readily known in the art. Nooney et al. (Synthesis of nanoscale mesoporous silica spheres with controlled particle size, Chemistry of Materials, 2002, Volume 14, pages 4721-4728), describes synthesis of MSNs which are suitable for the subject invention. MSNs of the present invention are shown in FIG. 1. All of the foregoing patent or non-patent literatures are hereby incorporated by reference in their entirety. Depending on the molar ratios of reactants in synthesizing MSNs and the synthesis conditions, such as pH condition, MSNs can be controlled over a range of diameters. MSNs of the present invention are in diameters suitable for good dispersion and film formation. MSNs of the present invention may be uniform in size or in a range of sizes. MSNs are spherical nanoparticles with a diameter of about 65 nm-740 nm with pores of about 1.5-20 nm in diameter.

In one embodiment, the diameter of MSNs is about 65 nm-400 nm. In another embodiment, the diameter of MSNs is approximately 100 nm.

Organosilica

The expression "Organosilica" as used herein refers to one or more types of compounds that contain organic group bonded to a silicon atom through an oxygen atom. The organosilica of the present invention is preferably in a sol-gel form. The present invention may comprise one or more types of organosilica, where the organosilica are commercially available. The commercially available organosilica includes, but is not limited to IPA-ST (an isopropanol dispersion silica sol having average particle diameter of 10-15 nm, 30-31% by weight of $SiO_2$, <1.0% of $H_2O$, <15 mPa·s of viscosity and pH2-4), IPA-ST-ZL (an isopropanol dispersion silica sol having average particle diameter of 70-100 nm, 30-31% by weight of $SiO_2$, <1.0% of $H_2O$, <15 mPa·s of viscosity and pH2-4), methanol silica sol, NPC-ST-30 (an ethylene glycol mono-n-propyl ether dispersion silica sol having average particle diameter of 10-15 nm, 30-31% by weight of $SiO_2$, <1.5% of $H_2O$, <25 mPa·s of viscosity and pH3-5), EG-ST (an ethylene glycol dispersion silica sol having average particle diameter of 10-15 nm, 20-21% by weight of $SiO_2$, <2.0% of $H_2O$, <15 mPa·s of viscosity and pH3-5), DMAC-ST (a N,N-Dimethyl acetamide dispersion silica sol having average particle diameter of 10-15 nm, 20-21% by weight of $SiO_2$, 3.0% of $H_2O$, <10 mPa·s of viscosity and pH4-6) and the like; Quartron®; Highlink®; OG Silica Organosol; and the like.

In one embodiment, the organosilica is triethoxyvinylsilane (VTEOS) and/or polymethylhydrosiloxane (PMHS). The amount of organosilica in the present water-based environmental coating composition is adjusted to attain properties desired for the coating composition. The water-based environmental coating composition of the present invention comprises approximately 55-75% by weight of organosilica. In one embodiment, the present composition comprises approximately 60-70% weight of organosilica. In some embodiment, the organosilica in the coating composition is approximately 62-68% by weight. One skilled in the art may vary percentages of organosilica to formulate coating composition according to the present invention in order to achieve desirable and favorable properties for different applications.

Functional Additives

The water-based coating composition provided by the present application exhibits excellent chemical tunability, thereby practical properties can be added easily to the coating composition by incorporation of functional additives. One or more functional additives are present in the subject composition in small amount of approximately 0.1-1.0% by weight. Examples of functional additives which may be included in the present composition includes, but are not limited to an UV absorber, a light stabilizer, a defoamer, curing agent, a dispersion stabilizer, an anionic emulsifier, a nonionic emulsifier, an inorganic flame retarding agent, a gloss improving agent, a thickener, a leveling agent, a coloring pigment or a wetting agent.

While the coating composition according to the present application exhibits UV protection property intrinsically, UV absorbing substances like zinc oxide nanoparticles and titanium oxide nanoparticles may be added to supplement UV absorbing properties to the coating composition. Furthermore, aluminum hydroxide and magnesium hydroxide may be added which act as additional inorganic flame retarding agents and aqueous polyacrylic ester or acid may be added for gloss improvement. Other examples of auxiliary agents include commercial modified polyurethane (e.g. R4188), commercial leveling agent (e.g. AMJ FL-333 and AMJ CP268), commercial dispersant (e.g. AMJ 991), commercial thickener (e.g. AMJ 3050), commercial defoamer (e.g. BYK 093) and commercial wetting agent (e.g. BYK 3521).

Antimicrobial agents and preservatives which kill or inhibit growth of harmful microorganisms are commonly incorporated into the coating composition. Example of commonly used antimicrobial agents and preservatives which can be used in the present invention include, but are not limited to parabens, esters of p-benzoic acid, formaldehyde releasers, isothiazolinones, organic acids, organic alcohols, certain metals, metal particles or metal salts, such as copper quinolinolate or silver nano-particles.

Applications of the Water-Based Coating Composition

The water-based coating composition of the present invention possesses excellent adhesion property to wide range of metallic or non-metallic substrates, surfaces or articles, such as concrete surface, mortar surface, slate plate, roofing tile, cement calcium silicate plate, pottery, glass, wood and others readily appreciated by those skilled in the art. Any previously coated or painted substrates, primed substrates, treated or untreated surface, chromate-treated metal, cold rolled steel, phosphatized metal, and metal coated with conventional electrodeposition primers may be coated with the present invention. The present coat composition can also be used to coat plastic substrates such as polyester reinforced fiberglass, reaction injection-molded urethanes and partially crystalline polyamides with proper surface activation. The present coating composition may be utilized as mono-coat on a substrate or applied to a substrate before or subsequent to other conventional coat compositions. The conventional coat compositions may further be applied onto the substrate upon the coating of the present invention. In particular, the present coating composition may act as a base coat, as an intercoat between a primer-base layer and a top coat layer or as a top coat. The exceptional adhesion characteristic of the present composition results in improved anti-scratch property of the finishing coated surface.

One or multiple layers of the present coating composition may be applied onto the surface of interest as required until a desired thickness is achieved. The coating composition of the present invention can be applied by conventional techniques as readily known by one skilled in the art. Application techniques include, but are not limited to air-spraying, airless spraying, electrostatic spraying, dipping, brushing, flow-coating, rotary atomizing and curtain coat flow coating. In one embodiment, static electricity is applied to the coating means, where necessary. In some embodiment, articles being coated by the present coating composition may be cured at room temperature to about 170° C. or about 60° C. to about 160° C. for 10 to 40 minutes. In some embodiments, the present coating composition is applicable to the conventional two-coat one-bake or the two-coat two bake coating method. Curing process can be effected by known heating means, namely hot air oven, electric oven, infrared ray induction furnace and the like.

WORKING EXAMPLES

The following examples are merely further illustrative of the present invention but are by no means limitative of the scope thereof. Other formulations of coating compositions would be apparent to those skilled in the art according to the embodiments described herein. Variation and modification of the coating composition will also be apparent to those skilled in the art so long as the spirit of the present invention is maintained.

Sample Formulation 1

| Ingredient | Weight % |
| --- | --- |
| VTEOS | 62.7 |
| MSNs | 9.0 |
| 0.1M Hydrochloric Acid (HCl) | 15.6 |
| Zinc Oxide Nanoparticles (Nominal size: ~20 nm) | 0.1 |
| Titanium dioxide Nanoparticles (size: 100-200 nm) | 0.1 |
| Water | 12.5 |
| Total | 100.0 |

Sample Formulation 2

| Ingredient | Weight % |
| --- | --- |
| VTEOS | 54.0 |
| PMHS | 13.5 |
| MSNs | 8.2 |
| 0.1M Hydrochloric Acid (HCl) | 13.5 |
| Water | 10.8 |
| Total | 100.0 |

MSNs Containing Coating Composition is Highly Hydrophobic

To evaluate the hydrophobicity of coating composition, contact angle measurement thereof with a surface being coated by coating composition is made. It is understood that the magnitude of the contact angle of a liquid to a solid surface reflects the degree of hydrophobicity thereof. Contact angles of MSN-containing composition according to the present invention, four non-MSN containing-solvent-based coating compositions, and two non-MSN containing-commercial environmental coating compositions are measured and compared (Table 1).

As seen in Table 1 below, the MSNs containing environment coating composition according to the present invention demonstrates a significantly higher average contact angle of 120.54° than those non MSN containing solvent-based coating compositions and existing commercial environmental coating compositions tested in parallel. The solvent-based coating compositions and commercial environmental coating compositions only show to have contact angles ranges from about 70°-90°. The results demonstrate that the present composition exhibits a superior hydrophobicity over existing solvent and water-based coating compositions, thereby providing excellent water resistance to coated surfaces.

| | Average contact angle (degree) |
| --- | --- |
| Solvent-based celluose bottom coating composition | 85.88 |
| Solvent-based celluose top coating composition | 91.93 |
| Solvent-based polyurethane bottom coating composition | 76.38 |
| Solvent-based polyurethane top coating composition | 84.28 |
| Commercial environmental coating composition A | 89.35 |
| Commercial environmental coating composition B | 69.43 |
| Environmental coating composition with MSNs of the present invention | 120.54 |

Table 1 shows contact angles of the present coating composition, four solvent-based cellulose coating compositions and two commercial environmental coating compositions.

MSNs Containing Coating Composition is Associated with Good Anti-Scratch Property To study the effectiveness of coating composition in protecting coated surfaces, anti-scratch property of coating composition is tested. Surfaces coated with the subject MSNs containing composition, two non MSN containing-solvent-base coating compositions and eight non MSN containing-environmental coating compositions undergo anti-scratch test, ASTM D3363-05. The anti-scratch test determines hardness of a coated film on a substrate in resisting scratches from drawing leads of known hardness. Coated surfaces of different coating compositions are tested against a drawing lead of 2H hardness with 200 g, 500 g and 1000 g vertical load. Results (Table 2) shows that the present coating composition withstands the anti-scratch test with up to 1000 g vertical load, while none of the two solvent-based coating compositions tested and only some of the commercial environmental coating compositions passed in the 1000 g vertical load test.

| | Vertical load (g) | | |
| --- | --- | --- | --- |
| Pencil test (✓ = Pass; x = Fail) | 200 | 500 | 1000 |
| Solvent-based cellulose coating composition | ✓ | ✓ | x |
| Solvent-based polyurethane coating composition | ✓ | ✓ | x |
| Commercial environmental coating composition A | x | x | x |

-continued

| Pencil test (✓ = Pass; x = Fail) | Vertical load (g) | | |
|---|---|---|---|
| | 200 | 500 | 1000 |
| Commercial environmental coating composition B | ✓ | x | x |
| Commercial environmental coating composition C | ✓ | ✓ | ✓ |
| Commercial environmental coating composition D | x | x | x |
| Commercial environmental coating composition E | ✓ | ✓ | x |
| Commercial environmental coating composition F | ✓ | ✓ | ✓ |
| Commercial environmental coating composition G | ✓ | x | x |
| Commercial environmental coating composition H | ✓ | x | x |
| Environmental coating composition with MSNs (Current invention) | ✓ | ✓ | ✓ |

Table 2 shows results of standard anti-scratch test using a 2H drawing lead under various vertical loads of 2 solvent based coating compositions, 8 commercial environmental coating compositions and the present invention.

MSNs Containing Coating Composition Shows Good Adhesive Strength

The adhesive strength of the present coating composition and the two solvent-based coating compositions and eight environment coating compositions tested above are further investigated. Standard testing method, ASTM D3359-08 which assesses adhesiveness of coating films to metallic substrates by applying and removing pressure-sensitive tape over cuts made in the film is used. According to the standard test method, the present coating composition has been rated as 4B, that is only detachment of small flakes of coating is observed and less than 5% of area is affected, comparable to one of the solvent-based test coating composition. On the other hand, most of the commercial environmental coating compositions are only rated as 3B where up to 15% of tested area is affected.

| Test samples | Classification |
|---|---|
| Solvent-based cellulose coating composition | 4B |
| Solvent-based polyurethane coating composition | 3B |
| Commercial environmental coating composition A | 3B |
| Commercial environmental coating composition B | 3B |
| Commercial environmental coating composition C | 3B |
| Commercial environmental coating composition D | 3B |
| Commercial environmental coating composition E | 1B |
| Commercial environmental coating composition F | 3B |
| Commercial environmental coating composition G | 4B |
| Environmental coating composition with MSNs (Current invention) | 4B |

Table 3 shows adhesive test results of 2 solvent based coating compositions, 8 commercial environmental coating compositions and the present invention.

To demonstrate this new generation water-based coating composition of the present invention displays technological superiorities over existing water-based coating composition. Various functional properties of the present invention are further tested and compared with three commercial MSN-free environmental coating compositions. In addition to complying to the RoHS and VOC standards, the present composition shows better UV protection property of up to 23% UVA blockage, while the commercial environmental coating compositions only demonstrate 6% or lower UVA blockage.

The present coating composition is also showed to be glossier than the commercial coating compositions. This is particular practical as gloss-finish coating compositions are generally more resistant to damage than less glossy or flat coating composition, more resistant to staining and easier to clean. Moreover, the present coating composition resists coffee, lubricating oils and greases which are household chemicals that other commercial coating compositions are vulnerable to. Results are summarized in FIG. 2.

INDUSTRIAL APPLICABILITY

The present invention discloses a new generation water-based environmental coating composition including MSNs, organosilica and water. The new generation coating composition exhibits improved film coating performances over both existing solvent-based and environmental coating compositions. The improved and favorable coating performance of the present coating composition is able to provide excellent protection and functionalization to a wide range of metallic and non-metallic substrates and articles.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the remainder of the disclosure in any way whatsoever. Without further elaboration, it is believed that one skilled in the art can, based on the description herein, utilize the present invention to its fullest extent. All publications recited herein are hereby incorporated by reference in their entirety.

What we claim:

1. A highly chemically tunable, transparent and rapidly drying water-based environmental coating composition that provides scratch resistance and water resistance to a surface effected therewith comprising one or more water-dispersible mesoporous silica nanoparticles capable for dispersion and film formation, triethoxyvinylsilane and/or polymethylhydrosiloxane, water and a film-forming catalyst that catalyses hydrolysis of said triethoxyvinylsilane and/or polymethylhydrosiloxane so as to accelerate formation of film from the coating composition such that a touch-drying time of the coating composition is less than two hours, wherein said environmental coating composition has less than 100 g/L of volatile organic chemicals, and a color of said surface is unaffected or a color incorporated into the coating composition is imparted to the surface to be effected with the coating composition.

2. The water-based coating composition of claim 1 further comprising an inorganic solvent.

3. The water-based coating composition of claim 1, wherein the film-forming catalyst comprises hydrochloric acid, sulfuric acid, sodium hydroxide and potassium hydroxide.

4. The water-based coating composition of claim 1 further comprising one or more functional additives, wherein the one or more functional additives comprises UV absorber, light stabilizer, defoamer, curing agent, dispersion stabilizer, anionic emulsifier, nonionic emulsifier, flame retarding agent, gloss improving agent, thickener, leveling agent, coloring pigment or wetting agent.

5. The water-based coating composition of claim 4 further comprising zinc oxide nanoparticles, titanium oxide nanoparticles, aluminium hydroxide or magnesium hydroxide or a combination thereof.

6. The water-based coating composition of claim 1, wherein the one or more mesoporous silica nanoparticles comprises mesoporous silica nanoparticles synthesized from cetyltrimethylammonium bromide and tetraethyl orthosilicate.

7. A surface coated with at least one layer of the water-based coating composition of claim 1 and a layer of a mesoporous silica nanoparticle-free coating composition where the water-based coating composition can be applied before, after, or before and after the mesoporous silica nanoparticle-free coating composition.

8. A method of preparing a surface coated with the water-based composition of claim 1 wherein the composition is applied by a coating application selected from the group consisting of air spray coating, airless spray coating, rotary atomizing coating, curtain flow coating, electrospray spraying, dipping, or brushing.

9. The water-based coating composition of claim 8, wherein the coating application uses static electricity.

10. The water-based coating composition of claim 1, wherein the one or more mesoporous silica nanoparticles are spherical nanopoarticles in a range of diameters from 65 nm to 740 nm.

11. A method of coating a surface for functionalizing the surface to increase scratch resistance and water-resistance thereof without release of hazardous substances comprising:
 formulating a water-based environmental coating composition, wherein said coating composition comprises one or more mesoporous silica nanoparticles capable for dispersion and film formation, triethoxyvinylsilane and/or polymethylhydrosiloxane, water and a film forming catalyst that catalyses hydrolysis of said triethoxyvinylsilane and/or polymethylhydrosiloxane so as to speed up film formation of the coating composition such that touch-drying time of the coating composition is less than two hours, wherein said coating composition has less than 100 g/L of volatile organic chemicals, and the coating composition is transparent such that color of said surface is unaffected or a color incorporated into the coating composition is imparted to the surface to be effected with the coating composition;
 coating one or more layers of said water-based coating composition onto said surface.

12. The method of coating a surface of claim 11 further comprises heat-curing said surface effected with the water-based coating composition.

13. The method of coating a surface of claim 11 further comprising coating one or more layers of mesoporous silica nanoparticle-free coating composition on said surface before said water-based coating composition is coated on said surface, coating said one or more layers of mesoporous silica nanoparticles-free coating composition after said water-based coating composition is coated on said surface or coating said one or more layers of mesoporous silica nanoparticle-free coating composition before and after said water-based coating composition is coated on said surface.

14. The method of coating a surface of claim 11, wherein said surface comprises a non-coated metal surface, plastic surface, concrete surface, mortar surface, slate plate, roofing tile, cement calcium silicate plate, pottery, glass, wood or a coated surface.

15. The method of coating a surface of claim 11, wherein the one or more mesoporous silica nanoparticles are spherical nanopoarticles in a range of diameters from 65 nm to 740 nm.

16. An article coated with the water-based coating composition of claim 1.

17. An article coated by the method of claim 11.

* * * * *